United States Patent [19]

Sato et al.

[11] 4,418,778
[45] Dec. 6, 1983

[54] BATTERY OPERATED FORKLIFT WITH A MOTOR DRIVEN POWER STEERING SYSTEM

[75] Inventors: Norio Sato, Tachikawa; Shohei Kamimoto, Musashimurayama, both of Japan

[73] Assignee: Nissan Motor Company, Limited, Yokohama, Japan

[21] Appl. No.: 228,922

[22] Filed: Jan. 27, 1981

[30] Foreign Application Priority Data

Jan. 28, 1980 [JP] Japan .................................... 55-7785

[51] Int. Cl.³ .............................................. B62D 5/06
[52] U.S. Cl. .................................. 180/132; 318/139; 417/44
[58] Field of Search ...................... 180/132, 242, 79.1; 60/431; 417/44, 45; 318/139

[56] References Cited

U.S. PATENT DOCUMENTS

| 3,134,063 | 5/1964 | Hastings | 318/139 |
| 3,163,252 | 12/1964 | Koci | 318/139 |
| 4,008,779 | 2/1977 | Shinoda | 180/132 |
| 4,153,128 | 5/1979 | Heitmeyer | 318/139 |

Primary Examiner—John A. Pekar
Attorney, Agent, or Firm—Lowe, King, Price & Becker

[57] ABSTRACT

In order to reduce the electric power consumption of a battery operated forklift, a terminal of a motor for driving a hydraulic pump of a power steering system is connected to a terminal of a field coil of a wheel drive motor of the battery operated forklift. Thus, an electric power current for the motor of the power steering system is supplied only when the wheel drive motor is operated.

6 Claims, 2 Drawing Figures

BATTERY OPERATED FORKLIFT WITH A MOTOR DRIVEN POWER STEERING SYSTEM

BACKGROUND OF THE INVENTION

1. Field of the Invention

The present invention relates to a battery operated forklift having a storage battery as a wheel driving power source, equipped with a motor driven power steering system.

2. Description of the Prior Art

In connection with a battery operated forklift, it is well known in the art that a power steering system is equipped for reducing the driver's effort to turn the steering wheel during the steering operation, and a hydraulic pump driven by a motor is used for supplying pressurized hydraulic fluid into a power steering system.

The forklift of this type, however has encountered a problem that the electric energy of the storage battery is constantly being consumed by the continuous driving of the power steering motor.

SUMMARY OF THE INVENTION

An object of the invention is therefore to provide an improved battery operated forklift in which a power steering motor for driving a hydraulic pump motor of the power steering system is driven only when the wheel drive motor is operated.

According to the present invention, a terminal of the power steering motor is connected to a terminal of a field coil of the wheel driving motor, thereby supplying a power current for the power steering motor through a circuit for the wheel drive motor.

DESCRIPTION OF THE PREFERRED EMBODIMENT

Figure 1:
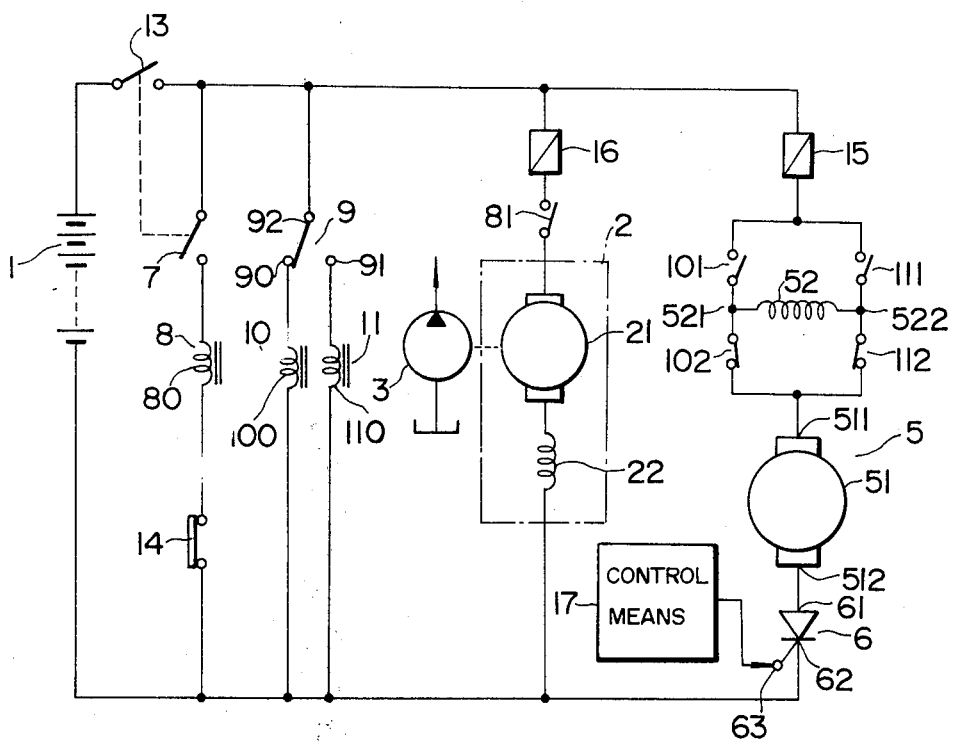
FIG. 1 is a circuit diagram of an example of electrical system of a prior art battery operated forklift.

Before entering into the explanation of the preferred embodiment, reference is first made to FIG. 1 showing an electrical system of a prior art battery operated forklift in order to clarify the problem encountered heretofore which has been solved by the invention.

As shown in FIG. 1, the electrical system of the prior art battery operated forklift comprises a storage battery 1 for supplying electric power energy and a power steering motor 2 for driving a hydraulic pump 3 of a power steering system. Electric current for the motor 2 is controlled by a relay 8 having a relay contact 81 connected in series with the motor 2. A fuse 16 is also interposed between a main switch 13 and the relay contact 81. A relay coil 80 of the relay 8 is connected in series with a parking brake switch 14 which is closed when the parking brake of the forklift is released, and a start switch 7 is interlocked with the main switch 13.

When the main switch 13 is closed and also the parking brake is released, the relay coil 80 of the relay 8 is energized by a current through the start switch 7 and the parking brake switch 14. Then, the motor 2 begins to rotate by a current through a fuse 16 and the relay contact 81 and the power steering system starts its operation.

Thus, the electrical system of the prior art battery forklift is constructed so that the power steering system works whenever the main switch 13 is closed and the parking brake is released at the same time.

However, as aforementioned, in the case of this prior art battery operated forklift, the problem arises of rapid consumption of electric energy of the storage battery 1 by the hydraulic pump driving motor 2, and the working time of the forklift per one time charge of the storage battery 1 is shortened by such electric power consumption.

Figure 2:
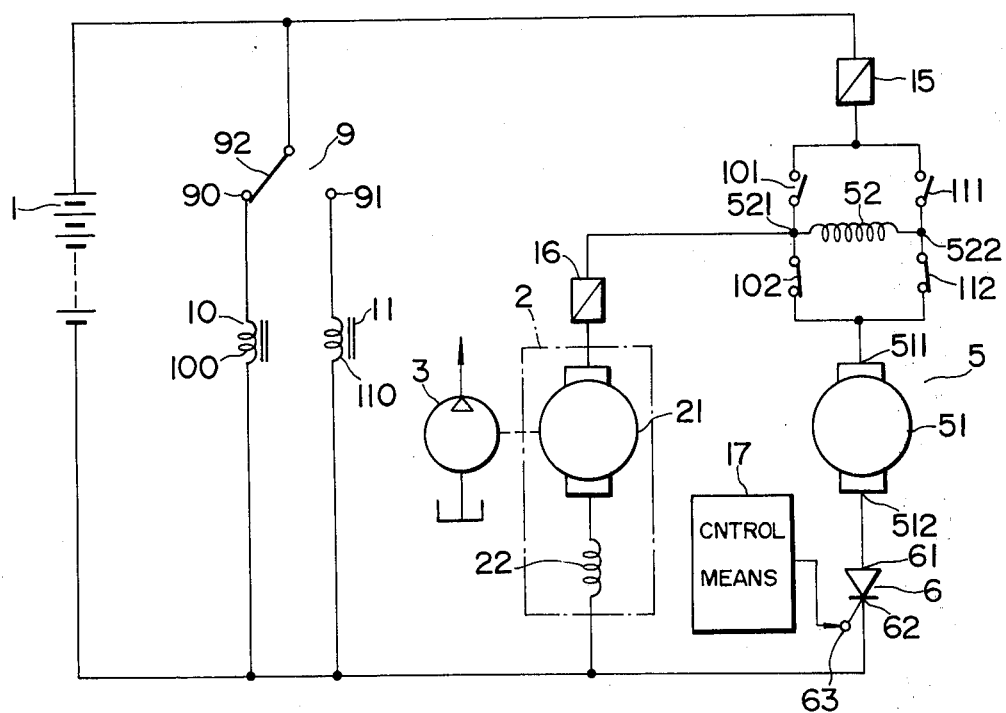
FIG. 2 is a circuit diagram of the electrical system of an embodiment of a battery operated forklift according to the present invention.

Turning to FIG. 2, an embodiment of the present invention will be explained. As shown, the electrical system of the battery operated forklift comprises a storage battery 1, a direct current series motor 2 for driving a hydraulic pump 3 of the power steering system (referred to as a power steering motor hereinafter), and a direct current series motor 5 for driving the wheels of the battery operated forklift (referred to as a wheel drive motor hereinafter). The wheel drive motor 5 includes a field coil 52 and an armature 51 having a series armature coil. A terminal 521 of the field coil 52 is coupled to a normally open relay contact 101 and a normally closed relay contact 102 of a relay 10 for forward movement of the forklift. Similarly, the other terminal 522 of the field coil 52 is coupled to a normally open relay contact 111 and a normally closed relay contact 112 of a relay 11 for backward movement of the forklift. A terminal 511 of the armature 51 is connected to a junction of the relay contacts 102 and 112, and an anode 61 of a chopper thyristor 6 is connected to the other terminal 512 of the armature 51. The cathode 62 of the thyristor 6 is connected to the negative terminal of the storage battery 1 and a predetermined control signal from control means 17 is applied to the gate 63 of this thyristor 6 for controlling the speed of the motor 5. A fuse 15 is connected between the positive terminal of the storage battery 1 and a junction of the relay contacts 101 and 111. The power steering motor 2 having a field coil 22 and an armature 21 is connected between the negative terminal of the storage battery 1 and the junction of the relay contacts 101, 102 and the field coil 52 via a fuse 16.

Relay coils 100, 110 of respective relays 10, 11 are supplied with a driving current through a forward and backward change-over switch 9 having a movable contact 92 and two stationary contacts 90, 91 respectively connected to relay coils 100 and 110.

The operation of the above electrical system will be explained hereinafter. When a driver of the forklift operates the change-over switch 9 for the forward movement, the movable contact 92 is connected to the stationary contact 90, and the relay coil 100 of the forward movement relay 10 is energized by a current from the storage battery 1. The energization of this relay coil 100 causes the normally open relay contact 101 to close and the normally closed relay contact 102 to open at the same time. As the result, a circuit is complete through the fuse 15, the relay contact 101, the field coil 52, the relay contact 112, the armature 51, and the thyristor 6.

The wheel drive motor 5 is thus supplied with a driving current in accordance with the operation of the thyristor 6, and the forklift moves forward at a desired speed. Furthermore, a circuit is also complete through the fuse 15, the relay contact 101, the fuse 16, the armature 21 and the field coil 22 of the power steering motor 2. Thus the power steering motor 2 is supplied with a driving current and the power steering system is actuated by the operation of the hydraulic pump 3.

On the other hand, when the movable contact 92 of the changeover switch 9 is moved to the stationary contact 91 for the backward movement of the forklift, the relay coil 110 of backward movement relay 11 is energized. The energization of this relay 11 causes the normally open relay contact 111 to close and the normally closed relay contact 112 to open. Thus, a circuit is complete through the fuse 15, relay contact 111, the field coil 52, the relay contact 102, the armature 51 and the thyristor 6.

In this case, since the field coil 52 is supplied with a driving current in the reverse direction as compared with the above case, the motor begins to rotate in the reverse direction. Thus, the forklift moves backward at the desired speed controlled by the thyristor 6.

In addition, the power steering motor 2 is supplied with a driving current through the fuse 15, relay contact 111, the field coil 52, and the fuse 16. Thus, the power steering system is also actuated when the change-over switch 9 is operated for the backward movement of the forklift.

It is also to be noted that, in this operating state, the power steering motor 2 and the field coil 52 are connected in series. However, the voltage drop across the field coil 52 is very small and the the operation of the power steering system is practically the same as that in the case of the forward movement of the forklift.

Lastly, when the change-over switch 9 is operated to a neutral position in order to stop the wheel drive motor 5, the power steering motor 2 is also stopped.

It will be appreciated from the foregoing, that according to the present invention, the driving current of the power steering motor 2 is controlled in accordance with the operation of the wheel drive motor 5 more specifically, the start and stop of the power steering motor 2 is synchronized with that of the wheel drive motor 5.

Thus, the power steering system is actuated only when the forklift is running, wherein the steering operation is required, and the operation of the power steering system is stopped during the period when the forklift stops.

The electric power consumption of the storage battery 1 is thus reduced and the working time per one time charge of the storage battery 1 is prolonged.

In addition, since a switch and a relay solely for the power steering motor is not used, the electrical system is simplified and the manufacturing cost is reduced.

What is claimed is:

1. An electrical system for a battery operated forklift comprising:
    a storage battery;
    a wheel drive motor including a field coil having a first and a second terminals and an armature having a first and a second terminals;
    a power steering motor including a field coil and an armature;
    a thyristor for controlling a current through said wheel drive motor, interposed between a negative terminal of the storage battery and said second terminal of the armature of said wheel drive motor;
    a forward movement relay having a relay coil and normally open and normally closed relay contacts;
    a backward movement relay having a relay coil and normally open and normally closed relay contacts; and
    a change-over switch having a movable contact and a pair of stationary contacts respectively connected to the relay coils of said forward movement relay and backward movement relay,
    wherein the normally closed contact of said forward movement relay being connected between the first terminal of the field coil and the first terminal of the armature of said wheel drive motor, the normally open relay contact of said forward movement relay being connected between a positive terminal of said storage battery and the first terminal of the field coil of said wheel drive motor, the normally closed contact of said backward movement relay being connected between the second terminal of the field coil and the first terminal of the armature of said wheel drive motor, and the normally open relay contact of said backward movement relay being connected between the positive terminal of said storage battery and the second terminal of the field coil of said wheel drive motor, characterised in that the power steering motor is connected between the first terminal of the field coil of said wheel drive motor and the negative terminal of said storage battery.

2. A battery operated forklift having a storage battery, a wheel drive motor and a power steering system with a power steering motor, characterized in that electric current for said power steering motor is supplied only when the wheel drive motor is operated, wherein said wheel drive motor has a field coil and an armature and wherein a terminal of said power steering motor is connected to a terminal of said field coil of said wheel drive motor.

3. A battery operated vehicle comprising:
    a storage battery;
    a wheel drive motor having a field coil and an armature; and
    a power steering system including a power steering motor which has a terminal connected to said field coil so that electric current is supplied to said power steering motor only when said wheel drive motor is operated.

4. A battery operated vehicle as claimed in claim 3 wherein a terminal of said power steering motor is connected to a terminal of said wheel drive motor through a thyristor forming part of a wheel drive motor speed control arrangement.

5. A battery operated vehicle as recited in claim 3 further comprising current flow control means for the field coil of said wheel drive motor, said current flow control means including a plurality of switching means connected to the field coil for selectively causing current to flow in one or another direction through the field coil,
    the plurality of switching means being arranged with the field coil in a bridge arrangement.

6. A battery operated vehicle comprising:
    a wheel drive motor;
    a power steering system including a power steering motor;
    means for supplying electrical current to said power steering motor only when current flows to said wheel drive motor; and
    a thyristor, forming part of a wheel drive motor speed control arrangement, connected in circuit with said wheel drive motor and said power steering motor.

* * * * *